(12) United States Patent
Kim et al.

(10) Patent No.: US 7,149,622 B2
(45) Date of Patent: Dec. 12, 2006

(54) METHOD AND APPARATUS FOR MEASURING PISTON TEMPERATURE

(75) Inventors: Ki Dong Kim, Incheon (KR); Kyoung Pyo Ha, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/302,082

(22) Filed: Dec. 12, 2005

(65) Prior Publication Data

US 2006/0137627 A1 Jun. 29, 2006

(30) Foreign Application Priority Data

Dec. 23, 2004 (KR) ............... 10-2004-0111256

(51) Int. Cl.
*G01K 1/00* (2006.01)
*G06F 17/00* (2006.01)

(52) U.S. Cl. .................................. 701/114

(58) Field of Classification Search ........... 701/114, 701/102, 115; 340/455; 374/141
See application file for complete search history.

(56) References Cited

U.S. PATENT DOCUMENTS

| 6,999,000 B1* | 2/2006 | Campbell et al. ...... 340/870.01 |
| 2004/0105484 A1* | 6/2004 | Ha .............................. 374/141 |

FOREIGN PATENT DOCUMENTS

| JP | 9-292287 A | * 11/1997 |
| KR | 1020030062387 A | 7/2003 |
| KR | 1020040049077 A | 6/2004 |

* cited by examiner

*Primary Examiner*—Hieu T. Vo
(74) *Attorney, Agent, or Firm*—Morgan Lewis & Bockius LLP

(57) ABSTRACT

An apparatus for measuring a piston temperature can simultaneously measure a temperature of a plurality of pistons by utilizing a Bluetooth unit and occurrence of noise is prevented.

10 Claims, 4 Drawing Sheets

METHOD AND APPARATUS FOR MEASURING PISTON TEMPERATURE

CROSS-REFERENCE TO RELATED APPLICATION

This application claims priority to and the benefit of Korean Patent Application No. 10-2004-0111256 filed in the Korean Intellectual Property Office on Dec. 23, 2004, the entire contents of which are incorporated herein by reference.

BACKGROUND OF THE INVENTION (a) Field of the Invention

The present invention relates to a method and an apparatus for measuring piston temperature. More particularly, the present invention relates to a method and apparatus for measuring piston temperature utilizing Bluetooth.

(b) Description of the Related Art

Generally, an internal combustion engine is an apparatus generating power by combustion of a fuel and generates a lot of heat during the power generating process. A combustion power generated in a combustion chamber is transmitted to a piston and transformed to a torque of a crankshaft. When an engine is operating, since the piston is always exposed to combustion gas at high temperature, this heat is transmitted to the piston. Therefore, in order to operate the engine stably and enhance output performance of the engine, a temperature of the piston may be measured.

In order to measure the temperature of the piston, wireless measuring machines have been utilized. However, communications by the wireless measuring machines may be interrupted by electromagnetic waves generated in the engine. In addition, a plurality of the wireless measuring machines are difficult to mount to a plurality of pistons.

SUMMARY OF THE INVENTION

The present invention provides a method and an apparatus for measuring a piston temperature having advantages of simultaneously measuring a plurality of pistons. An exemplary apparatus for measuring piston temperature according to an embodiment of the present invention includes a plurality of sensor units including at least one thermocouple and a signal processor, wherein one end of the at least one thermocouple is mounted to at least one portion of the piston and the at least one thermocouple generates a voltage signal corresponding to a temperature of the portion, and wherein the signal processor generates a piston temperature signal corresponding to the temperature of the piston on the basis of the voltage signals received from the thermocouple, a plurality of Bluetooth units receiving the piston temperature signal from the sensor units and having at least two communication members apart from each other, the piston temperature signal being transmitted from one of the communication members to the other via wireless communication of Bluetooth communication type, and a power supply unit supplying a power to the sensor units and the Bluetooth units, wherein the plurality of sensor units and the plurality of Bluetooth units are provided in a number corresponding to a number of the plurality of pistons such that temperatures of the plurality of pistons can be simultaneously measured. The thermocouples are provided in plurality and are mounted to a plurality of portions of the piston. The signal processor comprises an input interface receiving a plurality of voltage signals from the plurality of thermocouples, a multiplexer sequentially selecting a specific voltage signal of the received voltage signals and outputting the selected signal, a plurality of cold junction temperature sensors detecting respective temperatures of cold junctions of the plurality of thermocouples and outputting corresponding cold junction temperature signals, an amplifier amplifying the voltage signals output from the multiplexer and the cold junction temperature signals output from the cold junction temperature sensors, a voltage inverter supplying negative power to the amplifier, and a micro control unit (MCU) calculating the temperature of the piston on the basis of the amplified voltage signals and the amplified cold junction temperature signals and outputting the piston temperature signals corresponding to the calculated temperature to the Bluetooth unit.

The MCU transforms the amplified voltage signals and the amplified cold junction temperature signals into digital signals and calculates temperatures of specific portions of the pistons on the basis of the transformed digital signals. Each Bluetooth unit preferably comprises a Bluetooth module receiving the piston temperature signals from the MCU through a serial communication and sending the piston temperature signals through an antenna, and a wireless communication gateway mounted to a static element of the engine and sending the piston temperature signals transmitted from the Bluetooth module.

The antenna may be formed in the shape of an "L" or any other suitable shape. Each of the Bluetooth units comprises a Bluetooth module receiving the piston temperature signals from the MCU through a serial communication and sending the piston temperature signals through an antenna, and a wireless communication gateway mounted to a static element of the engine and sending the piston temperature signals transmitted from the Bluetooth module, wherein the sensor unit is disposed inside a case mounted to a bigger end of a connecting rod connected to the piston and the Bluetooth module is disposed outside the case. A method is provided for measuring piston temperature of a plurality of pistons utilizing an apparatus for measuring temperature of a plurality of pistons comprising a plurality of thermocouples mounted to specific portions of each piston, a plurality of sensor units provided to respective pistons of an engine, and a plurality of Bluetooth units respectively connected to the plurality of sensor units according to an embodiment of the present invention. The method includes generating a plurality of voltage signals corresponding to temperatures of specific portions of the piston, measuring cold junction temperatures of the plurality of thermocouples and generating cold junction temperature signals corresponding to the measured cold junction temperatures of the plurality of thermocouples, generating piston temperature signals corresponding to the temperatures of the piston on the basis of the plurality of voltage signals and the cold junction temperature signals, and wirelessly sending out the generated piston temperature signals through Bluetooth communication.

DETAILED DESCRIPTION OF THE EMBODIMENTS

An exemplary embodiment of the present invention will hereinafter be described in detail with reference to the accompanying drawings.

Figure 1:
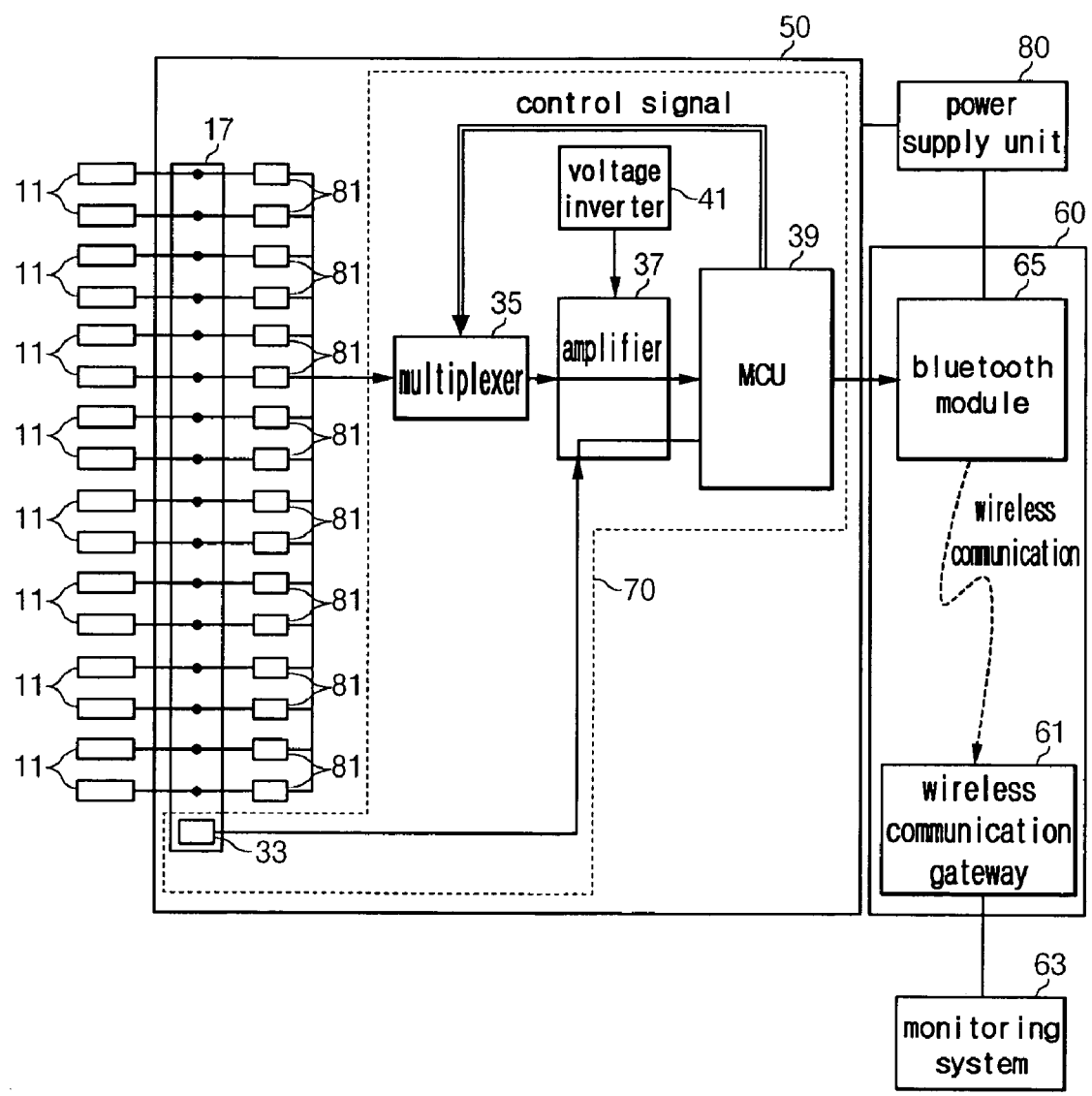
FIG. 1 is a block diagram showing an apparatus for measuring a piston temperature according to an exemplary embodiment of the present invention.

As shown in FIG. 1, according to an exemplary embodiment of the present invention, an apparatus for measuring a piston temperature includes a plurality of sensor units 50 including at least one thermocouple 11 and a signal processor 70 wherein one end of at least one thermocouple 11 is mounted to at least one portion of the piston and at least one thermocouple 11 is generating voltage signals corresponding to a temperature of the portion and wherein the signal processor 70 generates a piston temperature signal corresponding to the temperature of the piston on the basis of the voltage signals received from the thermocouple 11, a plurality of Bluetooth units 60 wirelessly sending out/receiving the temperature signal received from the sensor unit 50, and a power supply unit 80 supplying a power to the sensor units 50 and the Bluetooth units 60. The plurality of sensor units 50 and the plurality of Bluetooth units 60 are provided in a number corresponding to a number of the plurality of pistons such that temperatures of the plurality of pistons can be simultaneously measured.

The plurality of Bluetooth units 60 receive the piston temperature signal from the sensor units 50 and have at least two communication members apart from each other. The piston temperature signal is preferably transmitted from one of the communication members to the other via wireless communication of Bluetooth communication type. The thermocouples 11 are provided as a plurality and are mounted to a plurality of the pistons.

According to an exemplary embodiment of the present invention, the apparatus for measuring piston temperature includes one or more thermocouples 11 (which in one possible embodiment, for example, may be 16 thermocouples) such that the apparatus can measure the temperature of one or more portions of the piston. The thermocouples 11 are connected to the signal processor 70 of the sensor unit 50 and transmit voltage signals to the sensor unit 50. The thermocouples 11 may be formed by any material having conduction and may be formed by a Chromel (a kind of alloy that mainly contains a nickel and chrome) and an Alumel (a kind of alloy that mainly contains a nickel).

The signals transmitted to the sensor unit 50 are transmitted to a monitoring system 63, such as a personal computer (PC) or a personal digital assistant (PDA), through the Bluetooth unit 50. The power supply unit 80 supplies power to the sensor unit 50 and the Bluetooth unit 60.

Generally, since a plurality of pistons are provided to an engine of a vehicle, according to an exemplary embodiment of the present invention, the thermocouple 11, the sensor unit 50, and the Bluetooth unit 60 of the apparatus for measuring piston temperature are each provided in plurality.

The signal processor 70 includes an input interface 81, a multiplexer 35, a temperature sensor 33, an amplifier 37, a voltage inverter 41, and a micro control unit (MCU) 39. The plurality of voltage signals input from the thermocouple 11 is transmitted to the input interface 81 and are filtered. The input interface 81 may include an RC filter. The multiplexer 35 sequentially selects a specific voltage signal of the filtered voltage signals and outputs the selected signal.

A cold junction 17 of the plurality of thermocouples 11 is mounted for cold junction compensation and in addition, a temperature sensor 33 is disposed for measuring temperature of the cold junction 17 in the sensor unit 50. The cold junction 17 is an isothermal block and the cold junction 17 is realized as an area including a temperature sensor 33 that is thermally intercepted from outside and known to a person of an ordinary skill in the art. The voltage signals output from the multiplexer 35 and the cold junction temperature signals output from the temperature sensor 33 located in the cold junction are input to the amplifier 37 and amplified. The amplified voltage signals and the temperature signals are input to the MCU 39.

The voltage inverter 41 transforms the voltage of the power and supplies the power to the amplifier 37. For example, the voltage inverter 41 supplies a negative power to the amplifier 37. The MCU 39 transforms the amplified voltage signals and the amplified cold junction temperature signals into digital signals. And then, the MCU 39 calculates the temperature of the specific portion of the piston on the basis of the transformed digital signals, and outputs piston temperature signals corresponding to the calculated temperature to the Bluetooth unit 60. The temperature of the specific portions is calculated by converting the digital signal transformed from the amplified voltage signal and the digital signal transformed from the amplified cold junction temperature signal into temperature values and adding them. In addition, the MCU 39 controls the multiplexer 35.

Referring to FIG. 1, the MCU 39 outputs a control signal for controlling the multiplexer 35. The MCU 39 controls the multiplexer 35 such that the multiplexer 35 orderly selects and outputs specific voltage signals of the plurality of voltage signals filtered in the input interface 81.

At least two communication members of each Bluetooth unit 60 are realized as a Bluetooth module 65 and a wireless communication gateway 61.

The Bluetooth unit 60 includes a Bluetooth module 65 and a wireless communication gateway 61. The Bluetooth unit 60 utilizes a master-slave method, and a plurality of slaves. In one possible embodiment, for example, 7 slaves can be connected to one master. According to an exemplary embodiment of the present invention, a plurality of Bluetooth modules 65, as the slaves, are connected to the wireless communication gateway 61, as the master. Therefore, the apparatus for measuring piston temperature can simultaneously measure the temperatures of a plurality of pistons. The Bluetooth communication is known to a person of an ordinary skill in the art, and thus a detailed description is omitted here.

The Bluetooth module 65 receives the piston temperature signals from the MCU 39 and transmits the piston temperature signals to the wireless communication gateway 61. The wireless communication gateway 61 is mounted to a static element of the engine and sends the piston temperature signals transmitted from the Bluetooth module 65 to the monitoring system 63. The wireless communication gateway 61 may be disposed to a crankcase of the engine, but is not limited thereto.

Figure 3:
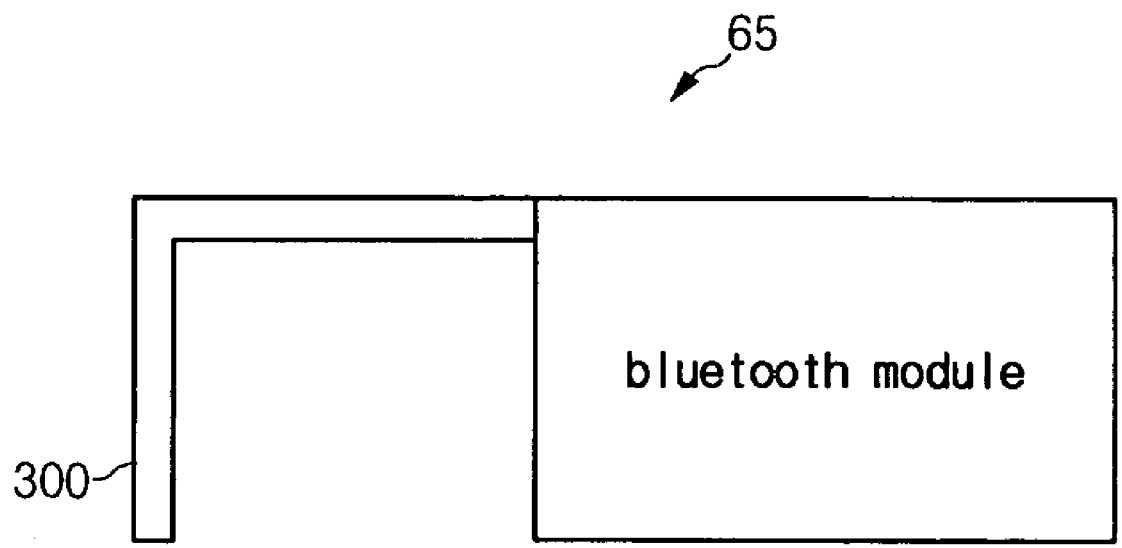
FIG. 3 shows a Bluetooth module of an apparatus for measuring a piston temperature according to an exemplary embodiment of the present invention.
Figure 4:
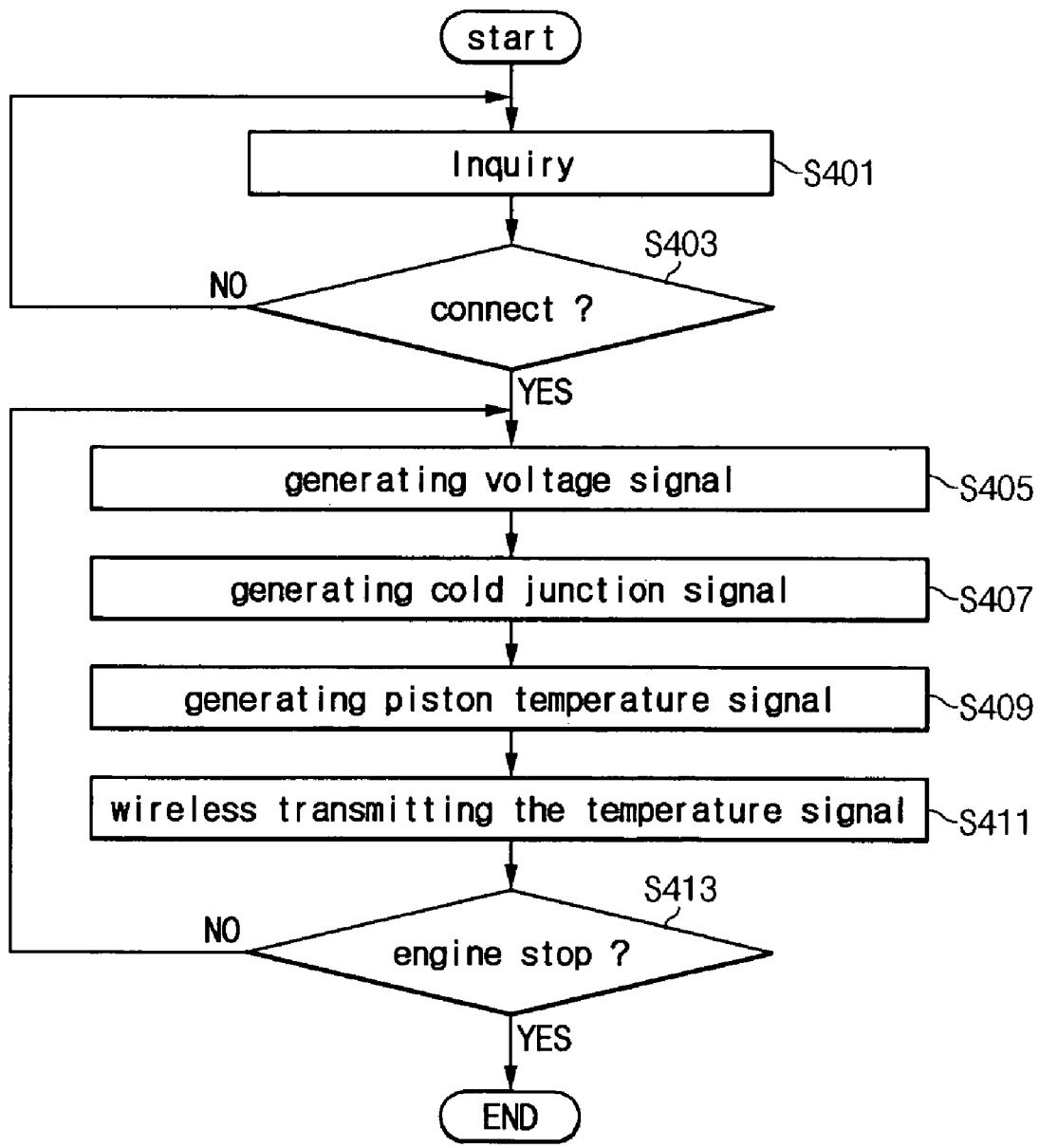
FIG. 4 shows a method for measuring a piston temperature according to an exemplary embodiment of the present invention.

As shown in FIG. 3, an antenna 300 may be formed in the shape of an "L" for enhancing efficiency of the antenna 300.

Figure 2:
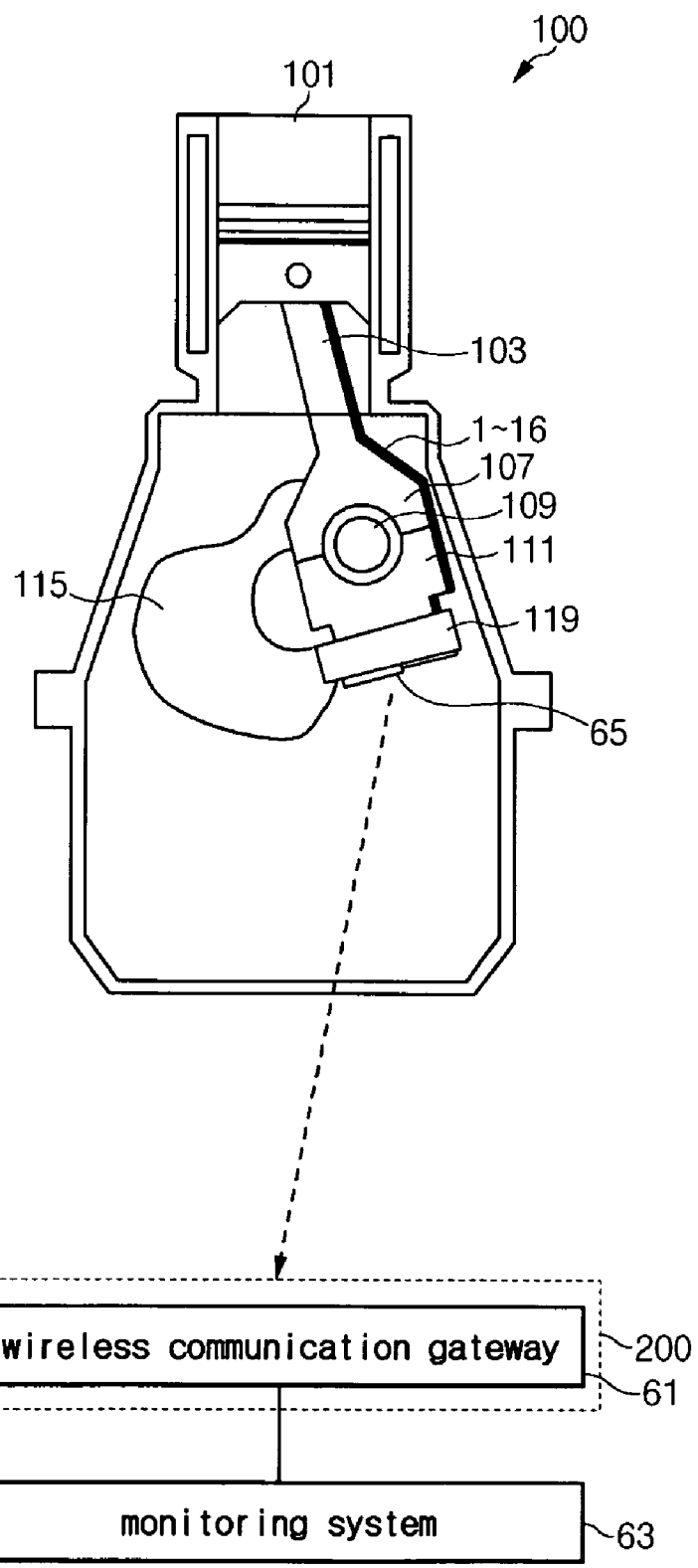
FIG. 2 shows an apparatus for measuring a piston temperature mounted to an engine according to an exemplary embodiment of the present invention.

Referring to FIG. 2, a piston 101 of an engine 100 is connected to a crankshaft 109 by a connecting rod 103. One end of the connecting rod 103 in a direction of the piston is called a smaller end and another end of the connecting rod 103 in a direction of the crankshaft is called a bigger end 107. According to an exemplary embodiment of the present invention, the sensor unit 50 and the Bluetooth module 65 may be disposed in a direction of the bigger end 107 of the connecting rod 103. More particularly, the sensor unit 50 and the Bluetooth module 65 may be disposed to a connecting rod cap 111 of the big end 107 of the connecting rod 103. That is, because the sensor unit 50 and the Bluetooth module 65 are not disposed to the piston 101, a shape change or a mass change of the piston 101 do not occur. A rotational inertia and rotating center of the connecting rod 103 and crankshaft 109 may be slightly changed, but the changes can be compensated by a balance weight 115 of the connecting rod 103. The thermocouple 11 may be secured to the connecting rod 103 in one embodiment.

Referring to FIG. 2, a case 119 and the Bluetooth module 65 may be mounted to the connecting rod cap 111. The sensor unit 50 is disposed inside the case 119 and the Bluetooth module 65 is disposed outside the case 119 for enhancing the efficiency of the wireless communication. The Bluetooth module 65 disposed outside the case 119 receives the signals transmitted from the sensor unit 50 and transmits the signals to the wireless communication gateway 61.

Referring to FIG. 1 to FIG. 4, the method for measuring piston temperature is described hereinafter.

If the piston 101 starts moving reciprocally, the wireless communication gateway 61 of the Bluetooth unit 60 inquiries of the Bluetooth module 65 (S401). The wireless communication gateway 61 then determines whether the Bluetooth module 65 is connected with the wireless communication gateway 61 (S403). At that time, if the Bluetooth module 65 and the wireless communication gateway 61 are not connected with each other, the wireless communication gateway 61 successively inquiries of the Bluetooth module 65. If the wireless communication gateway 61 is connected with the Bluetooth module 65, the sensor unit 50 receives signals from the thermocouples 11 and generates the plurality of voltage signals corresponding to the temperatures of the specific portions of the piston 101 (S405).

After the step S405 is over, the cold junction temperature of the plurality of thermocouples 11 is measured and a corresponding cold junction temperature signal is generated (S407). Then, the piston temperature signals corresponding to the temperatures of the piston 101 are generated on the basis of the plurality of voltage signals and the cold junction temperature signal (S409). The generated piston temperature signals are wirelessly sent from the Bluetooth module 65 to the wireless communication gateway 61 by Bluetooth communication (S411).

After the piston temperature signals are sent to the wireless communication gateway 61, the temperature signals are transmitted to the monitoring system 63 and displayed. The MCU 39 also determines whether the engine 100 is operating (S413).

If the engine 100 stops, measurement of piston temperature is over, or if the engine 100 does not stop, the MCU 39 returns to the step S405 and repeats measuring the piston temperature.

The MCU 39 can be realized as at least one microprocessor activated by a predetermined program, and the predetermined program can be programmed to perform each step of the method according to an exemplary embodiment of the present invention.

According to an exemplary embodiment of the present invention, the apparatus for measuring piston temperature does not affect operation of the engine and can measure accurate temperatures by the thermocouple. In addition, because Bluetooth communication method is used, a communication barrier caused by electromagnetic waves occurred in an engine is prevented, and therefore the piston temperature signals can be transmitted without noise. Also, an apparatus for measuring piston temperature according to an exemplary embodiment of the present invention can simultaneously measure the temperatures of a plurality of pistons. Because the plurality of thermocouples are used, temperatures of a plurality of portions of one piston can be simultaneously measured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for measuring temperature of a plurality of pistons of an engine, comprising:
   a plurality of sensor units including at least one thermocouple and a signal processor,
   wherein one end of the at least one thermocouple is mounted to at least one portion of the piston and the at least one thermocouple generates a voltage signal corresponding to a temperature of the portion, and
   the signal processor generates a piston temperature signal corresponding to the temperature of the piston on the basis of the voltage signals received from the thermocouple;
   a plurality of Bluetooth units receiving the piston temperature signal from the sensor units and having at least two communication members apart from each other, the piston temperature signal being transmitted from one of the communication members to the other via wireless communication in Bluetooth communication type; and
   a power supply unit supplying power to the sensor units and the Bluetooth units,
   wherein the plurality of sensor units and the plurality of Bluetooth units are provided in a number corresponding to a number of the plurality of pistons such that temperatures of the plurality of pistons can be simultaneously measured.

2. The system of claim 1, wherein the thermocouples are provided as a plurality and are mounted to a plurality of portions of the piston.

3. The system of claim 1, wherein the signal processor comprises:
   an input interface receiving a plurality of voltage signals from the plurality of thermocouples;
   a multiplexer sequentially selecting a specific voltage signal of the received voltage signals and outputting the selected signal;
   a plurality of cold junction temperature sensors detecting respective temperatures of cold junctions of the plurality of thermocouples and outputting corresponding cold junction temperature signals;
   an amplifier amplifying the voltage signals output from the multiplexer and the cold junction temperature signals output from the cold junction temperature sensors;
   a voltage inverter supplying negative power to the amplifier; and
   a micro control unit (MCU) calculating the temperature of the piston on the basis of the amplified voltage signals and the amplified cold junction temperature signals and outputting the piston temperature signals corresponding to the calculated temperature to the Bluetooth unit.

4. The system of claim 3, wherein the MCU transforms the amplified voltage signals and the amplified cold junction temperature signals into digital signals and calculates temperatures of specific portions of the pistons on the basis of the transformed digital signals.

5. The system of claim 3, wherein each of the Bluetooth unit comprises:
   a Bluetooth module receiving the piston temperature signals from the MCU through a serial communication and sending the piston temperature signals through an antenna; and
   a wireless communication gateway mounted to a static element of the engine and sending the piston temperature signals transmitted from the Bluetooth module.

6. The system of claim 5, wherein the antenna is formed in the shape of an "L".

7. The system of claim 1, wherein each of the Bluetooth units comprises:
   a Bluetooth module receiving the piston temperature signals from the MCU through a serial communication and sending the piston temperature signals through an antenna; and
   a wireless communication gateway mounted to a static element of the engine and sending the piston temperature signals transmitted from the Bluetooth module,
   wherein the sensor unit is disposed inside a case mounted to a bigger end of a connecting rod connected to the piston and the Bluetooth module is disposed outside the case.

8. A method for measuring temperature of a plurality of pistons utilizing a system for measuring the temperature of a plurality of pistons comprising a plurality of thermocouples mounted to specific portions of each piston, a plurality of sensor units provided to respective pistons of an engine, and a plurality of Bluetooth units respectively connected to the plurality of sensor units, the method comprising:
   generating a plurality of voltage signals corresponding to temperatures of specific portions of the piston;
   measuring cold junction temperatures of the plurality of thermocouples and generating cold junction temperature signals corresponding to the measured cold junction temperatures of the plurality of thermocouples;
   generating piston temperature signals corresponding to the temperatures of the piston on the basis of the plurality of voltage signals and the cold junction temperature signals; and
   wirelessly sending out the generated piston temperature signals through Bluetooth communication.

9. The method of claim 8, further comprising receiving the temperature signals via Bluetooth communication by a computer.

10. The method of claim 8, wherein the voltage signals are received by a multiplexer.

* * * * *